United States Patent
Bhasin

(10) Patent No.: US 12,277,564 B2
(45) Date of Patent: Apr. 15, 2025

(54) METHOD, SYSTEM, AND COMPUTER PROGRAM PRODUCT FOR DETECTING DUPLICATE AUTHORIZATION REQUESTS

(71) Applicant: Visa International Service Association, San Francisco, CA (US)

(72) Inventor: Gurpreet Singh Bhasin, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 369 days.

(21) Appl. No.: 17/636,041

(22) PCT Filed: Aug. 21, 2019

(86) PCT No.: PCT/US2019/047464
§ 371 (c)(1),
(2) Date: Feb. 17, 2022

(87) PCT Pub. No.: WO2021/034324
PCT Pub. Date: Feb. 25, 2021

(65) Prior Publication Data
US 2022/0300975 A1  Sep. 22, 2022

(51) Int. Cl.
*G06Q 20/40* (2012.01)
*G06Q 20/06* (2012.01)
*G06Q 20/38* (2012.01)

(52) U.S. Cl.
CPC ....... *G06Q 20/4016* (2013.01); *G06Q 20/065* (2013.01); *G06Q 20/3827* (2013.01); *G06Q 20/407* (2013.01); *G06Q 2220/00* (2013.01)

(58) Field of Classification Search
None
See application file for complete search history.

(56) References Cited

U.S. PATENT DOCUMENTS 7,680,923 B1 * 3/2010 Allan .................... H04L 43/026
709/224
8,719,160 B1   5/2014 Abernethy et al.
(Continued)

FOREIGN PATENT DOCUMENTS

CN   105187468 A * 12/2015 ............. H04L 67/16

OTHER PUBLICATIONS

Shahabeddin Geravand, Mahmood Ahmadi, ""Bloom filter applications in network security: A state-of-the-art survey,"" Computer Networks, vol. 57, Issue 18, 2013, pp. 4047-4064, ISSN 1389-1286, https://doi.org/10.1016/j.comnet.2013.09.003. (Year: 2013).*
(Continued)

*Primary Examiner* — Eduardo Castilho
(74) *Attorney, Agent, or Firm* — The Webb Law Firm

(57) ABSTRACT

A method for detecting duplicate authorization requests includes: receiving an authorization request over an electronic payment processing network associated with an electronic payment transaction; determining whether the authorization request is a potential duplicate authorization request or is not a duplicate authorization request based on a bloom filter; in response to determining that the authorization request is a potential duplicate authorization request, determining a connectivity quality associated with the electronic payment processing network; and determining whether to process the authorization request based on the connectivity quality. A system and computer program product for detecting duplicate authorization requests are also disclosed.

18 Claims, 5 Drawing Sheets

(56) References Cited

U.S. PATENT DOCUMENTS

| | | | |
|---|---|---|---|
| 10,037,517 B1* | 7/2018 | Chi | G06Q 20/4016 |
| 10,049,349 B1 | 8/2018 | Grassadonia et al. | |
| 10,055,721 B1* | 8/2018 | Mocko | G06Q 20/20 |
| 11,347,808 B1* | 5/2022 | Plenderleith | G06F 16/2455 |
| 2004/0243828 A1* | 12/2004 | Aguilera | G06F 21/64 |
| | | | 726/27 |
| 2010/0250408 A1 | 9/2010 | Stokes et al. | |
| 2015/0172900 A1* | 6/2015 | Pianese | H04W 4/80 |
| | | | 370/254 |
| 2015/0339463 A1* | 11/2015 | Cardamore | G06F 21/51 |
| | | | 726/4 |
| 2017/0083717 A1* | 3/2017 | Medvedev | G06F 21/6218 |
| 2018/0330346 A1* | 11/2018 | Grassadonia | G06Q 20/3278 |
| 2019/0180257 A1* | 6/2019 | Lee | G06Q 20/40 |
| 2020/0125391 A1* | 4/2020 | Lee | G06Q 20/389 |

OTHER PUBLICATIONS

A. El Orche, M. Bahaj and S. A. Alhayat, "Ontology Based on Electronic Payment Fraud Prevention," 2018 IEEE 5th International Congress on Information Science and Technology (CiSt), Marrakech, Morocco, 2018, pp. 143-148, doi: 10.1109/CIST.2018.8596486. (Year: 2018).*

* cited by examiner

METHOD, SYSTEM, AND COMPUTER PROGRAM PRODUCT FOR DETECTING DUPLICATE AUTHORIZATION REQUESTS

CROSS-REFERENCE TO RELATED APPLICATION

This application is the United States national phase of International Application No. PCT/US2019/047464 filed Aug. 21, 2019, the entire disclosure of which is hereby incorporated by reference in its entirety.

BACKGROUND

1. Technical Field

This disclosure relates to detecting duplicate authorization requests and, in some non-limiting embodiments or aspects, to a method, system, and computer program product for detecting duplicate authorization requests.

2. Technical Considerations

In an electronic payment processing network for processing electronic payment transactions, a merchant may inadvertently submit duplicate payment authorization requests. For example, the merchant may resubmit a payment authorization request in response to not receiving an authorization response to the first payment authorization request. Alternatively, a consumer hitting the submit button twice for the same order may cause the merchant to inadvertently submit a duplicate payment authorization request. Identification of the payment authorization request as a duplicate avoids the electronic payment processing network processing the same payment transaction twice.

Existing systems for detecting duplicate payment authorization requests require the merchant to implement detection logic on its backend servers to indicate whether a payment authorization request is a duplicate. However, not all merchants have such logic implemented, meaning that certain merchant systems cannot indicate whether a payment authorization request is a duplicate.

SUMMARY

Accordingly, and generally, provided is an improved method, system, and computer program product for detecting duplicate authorization requests.

According to some non-limiting embodiments or aspects, a method for detecting duplicate authorization requests includes: receiving, with at least one processor, an authorization request over an electronic payment processing network associated with an electronic payment transaction; determining, with at least one processor, whether the authorization request is a potential duplicate authorization request or is not a duplicate authorization request based on a bloom filter; in response to determining that the authorization request is a potential duplicate authorization request, determining, with at least one processor, a connectivity quality associated with the electronic payment processing network; and determining, with at least one processor, whether to process the authorization request based on the connectivity quality.

In some non-limiting embodiments or aspects, the connectivity quality may be based on at least one of the following: a network health score, a merchant system health score, a payment gateway system health score, an acquirer system health score, a transaction service provider system health score, an issuer system health score, or any combination thereof. The connectivity quality may be based on a response time within the electronic payment processing network. The method may further include: in response to determining that the authorization request is potential duplicate authorization request, determining, with at least one processor, that the potential duplicate authorization request is an actual duplicate authorization request. Determining that the potential duplicate authorization request is an actual duplicate authorization request may be based on a second filter. Determining whether to process the authorization request may be based on connectivity rules provided by a merchant system. The method may further include: determining, with at least one processor, a hash value associated with the authorization request, where determining whether the authorization request is a potential duplicate authorization request includes comparing the hash value associated with the authorization request with a hash value associated with a prior authorization request using the bloom filter. Determining that the potential duplicate authorization request is an actual duplicate authorization request may include comparing a hash value associated with the authorization request with a hash value associated with a prior authorization request. Processing the authorization request based on the connectivity quality may include submitting the authorization request for processing in response to determining that the connectivity quality does not satisfy a threshold. The method may further include adjusting a sensitivity associated with the bloom filter based on the connectivity quality.

According to some non-limiting embodiments or aspects, a system for detecting duplicate authorization requests includes at least one processor programmed or configured to: receive an authorization request over an electronic payment processing network associated with an electronic payment transaction; determine whether the authorization request is a potential duplicate authorization request or is not a duplicate authorization request based on a bloom filter; in response to determining that the authorization request is a potential duplicate authorization request, determine a connectivity quality associated with the electronic payment processing network; and determine whether to process the authorization request based on the connectivity quality.

In some non-limiting embodiments or aspects, the connectivity quality may be based on at least one of the following: a network health score, a merchant system health score, a payment gateway system health score, an acquirer system health score, a transaction service provider system health score, an issuer system health score, or any combination thereof. The connectivity quality may be based on a response time within the electronic payment processing network. The at least one processor may be programmed or configured to: in response to determining that the authorization request is a potential duplicate authorization request, determine that the potential duplicate authorization request is an actual duplicate authorization request. Determining that the potential duplicate authorization request is an actual duplicate authorization request may be based on a second filter. Determining whether to process the authorization request may be based on connectivity rules provided by a merchant system. The at least one processor may be programmed or configured to: determine a hash value associated with the authorization request, where determining whether the authorization request is a potential duplicate authorization request includes comparing the hash value associated with the authorization request with a hash value associated with a prior authorization request using the bloom filter. Determining that the potential duplicate authorization request is an actual duplicate authorization request may include comparing a hash value associated with the authorization request with a hash value associated with a prior authorization request. Processing the authorization request based on the connectivity quality may include submitting the authorization request for processing in response to determining that the connectivity quality does not satisfy a threshold. The at least one processor may be programmed or configured to adjust a sensitivity associated with the bloom filter based on the connectivity quality.

According to some non-limiting embodiments or aspects, a computer program product for detecting duplicate authorization requests includes at least one non-transitory computer-readable medium including one or more instructions that, when executed by at least one processor, cause the at least one processor to: receive an authorization request over an electronic payment processing network associated with an electronic payment transaction; determine whether the authorization request is a potential duplicate authorization request or is not a duplicate authorization request based on a bloom filter; in response to determining that the authorization request is a potential duplicate authorization request, determine a connectivity quality associated with the electronic payment processing network; and determine whether to process the authorization request based on the connectivity quality.

In some non-limiting embodiments or aspects, the connectivity quality may be based on at least one of the following: a network health score, a merchant system health score, a payment gateway system health score, an acquirer system health score, a transaction service provider system health score, an issuer system health score, or any combination thereof. The connectivity quality may be based on a response time within the electronic payment processing network. The one or more instructions may cause the at least one processor to: in response to determining that the authorization request is a potential duplicate authorization request, determine that the potential duplicate authorization request is an actual duplicate authorization request. Determining that the potential duplicate authorization request is an actual duplicate authorization request may be based on a second filter. Determining whether to process the authorization request may be based on connectivity rules provided by a merchant system. The one or more instructions may cause the at least one processor to: determine a hash value associated with the authorization request, where determining whether the authorization request is a potential duplicate authorization request includes comparing the hash value associated with the authorization request with a hash value associated with a prior authorization request using the bloom filter. Determining that the potential duplicate authorization request is an actual duplicate authorization request may include comparing a hash value associated with the authorization request with a hash value associated with a prior authorization request. Processing the authorization request based on the connectivity quality may include submitting the authorization request for processing in response to determining that the connectivity quality does not satisfy a threshold. The one or more instructions may cause the at least one processor to adjust a sensitivity associated with the bloom filter based on the connectivity quality.

According to some non-limiting embodiments or aspects, a method for detecting duplicate authorization requests includes: storing, with at least one processor, a hash value associated with a prior authorization request; receiving, with at least one processor, an authorization request over an electronic payment processing network associated with an electronic payment transaction; determining, with at least one processor, a hash value associated with the authorization request; determining, with at least one processor, whether the authorization request is a potential duplicate authorization request by comparing the hash value associated with the authorization request with the hash value associated with the prior authorization request; in response to determining that the authorization request is a potential duplicate authorization request, determining, with at least one processor, a connectivity quality associated with the electronic payment processing network; based on the connectivity quality, determining, with at least one processor, whether to submit the authorization request for processing.

In some non-limiting embodiments or aspects, the connectivity quality may be based on at least one of the following: a network health score, a merchant system health score, a payment gateway system health score, an acquirer system health score, a transaction service provider system health score, an issuer system health score, or some combination thereof. The connectivity quality may be based on a response time within the electronic payment processing network. The method may further include: in response to determining that the authorization request is a potential duplicate authorization request, determining, with at least one processor, that the potential duplicate authorization request is an actual duplicate authorization request. Determining whether to submit the authorization request for processing may be based on connectivity rules provided by a merchant system. Determining whether the authorization request is a potential duplicate authorization request may include using a bloom filter to compare the hash value associated with the authorization request with the hash value associated with the prior authorization request. Determining that the potential duplicate authorization request is an actual duplicate authorization request may include comparing the hash value associated with the authorization request with the hash value associated with the prior authorization request. The method may further include submitting the authorization request for processing in response to determining that the connectivity quality does not satisfy a threshold. The method may further include adjusting a sensitivity associated with the bloom filter based on the connectivity quality.

According to some non-limiting embodiments or aspects, a system for detecting duplicate authorization requests includes at least one processor programmed or configured to: store a hash value associated with a prior authorization request; receive an authorization request over an electronic payment processing network associated with an electronic payment transaction; determine a hash value associated with the authorization request; determine whether the authorization request is a potential duplicate authorization request by comparing the hash value associated with the authorization request with the hash value associated with the prior authorization request; in response to determining that the authorization request is a potential duplicate authorization request, determine a connectivity quality associated with the electronic payment processing network; based on the connectivity quality, determine whether to submit the authorization request for processing.

In some non-limiting embodiments or aspects, the connectivity quality may be based on at least one of the following: a network health score, a merchant system health score, a payment gateway system health score, an acquirer system health score, a transaction service provider system health score, an issuer system health score, or some combination thereof. The connectivity quality may be based on a response time within the electronic payment processing network. The at least one processor may be programmed or configured to: in response to determining that the authorization request is a potential duplicate authorization request, determine that the potential duplicate authorization request is an actual duplicate authorization request. Determining whether to submit the authorization request for processing may be based on connectivity rules provided by a merchant system. Determining whether the authorization request is a potential duplicate authorization request may include using a bloom filter to compare the hash value associated with the authorization request with the hash value associated with the prior authorization request. Determining that the potential duplicate authorization request is an actual duplicate authorization request may include comparing the hash value associated with the authorization request with the hash value associated with the prior authorization request. The at least one processor may be programmed or configured to: submit the authorization request for processing in response to determining that the connectivity quality does not satisfy a threshold. The at least one processor may be programmed or configured to adjust a sensitivity associated with the bloom filter based on the connectivity quality.

According to some non-limiting embodiments or aspects, a computer program product for detecting duplicate authorization requests includes at least one non-transitory computer-readable medium including one or more instructions that, when executed by at least one processor, cause the at least one processor to: store a hash value associated with a prior authorization request; receive an authorization request over an electronic payment processing network associated with an electronic payment transaction; determine a hash value associated with the authorization request; determine whether the authorization request is a potential authorization request by comparing the hash value associated with the authorization request with the hash value associated with the prior authorization request; in response to determining that the authorization request is a potential duplicate authorization request, determine a connectivity quality associated with the electronic payment processing network; based on the connectivity quality, determine whether to submit the authorization request for processing.

In some non-limiting embodiments or aspects, the connectivity quality may be based on at least one of the following: a network health score, a merchant system health score, a payment gateway system health score, an acquirer system health score, a transaction service provider system health score, an issuer system health score, or some combination thereof. The connectivity quality may be based on a response time within the electronic payment processing network. The one or more instructions may cause the at least one processor to: in response to determining that the authorization request is a potential duplicate authorization request, determine that the potential duplicate authorization request is an actual duplicate authorization request. Determining whether to submit the authorization request for processing may be based on connectivity rules provided by a merchant system. Determining whether the authorization request is a potential duplicate authorization request may include using a bloom filter to compare the hash value associated with the authorization request with the hash value associated with the prior authorization request. Determining that the potential duplicate authorization request is an actual duplicate authorization request may include comparing the hash value associated with the authorization request with the hash value associated with the prior authorization request. The one or more instructions may cause the at least one processor to: submit the authorization request for processing in response to determining that the connectivity quality does not satisfy a threshold. The one or more instructions may cause the at least one processor to: adjust a sensitivity associated with the bloom filter based on the connectivity quality.

Further non-limiting embodiments or aspects are set forth in the following numbered clauses:

Clause 1: A method for detecting duplicate authorization requests, comprising: receiving, with at least one processor, an authorization request over an electronic payment processing network associated with an electronic payment transaction; determining, with at least one processor, whether the authorization request is a potential duplicate authorization request or is not a duplicate authorization request based on a bloom filter; in response to determining that the authorization request is a potential duplicate authorization request, determining, with at least one processor, a connectivity quality associated with the electronic payment processing network; and determining, with at least one processor, whether to process the authorization request based on the connectivity quality.

Clause 2: The method of clause 1, wherein the connectivity quality is based on at least one of the following: a network health score, a merchant system health score, a payment gateway system health score, an acquirer system health score, a transaction service provider system health score, an issuer system health score, or any combination thereof.

Clause 3: The method of clause 1 or 2, wherein the connectivity quality is based on a response time within the electronic payment processing network.

Clause 4: The method of any of clauses 1-3, further comprising: in response to determining that the authorization request is a potential duplicate authorization request, determining, with at least one processor, that the potential duplicate authorization request is an actual duplicate authorization request.

Clause 5: The method of any of clauses 1-4, wherein determining that the potential duplicate authorization request is an actual duplicate authorization request is based on a second filter.

Clause 6: The method of any of clauses 1-5, wherein determining whether to process the authorization request is based on connectivity rules provided by a merchant system.

Clause 7: The method of any of clauses 1-6, further comprising: determining, with at least one processor, a hash value associated with the authorization request, wherein determining whether the authorization request is a potential duplicate authorization request comprises comparing the hash value associated with the authorization request with a hash value associated with a prior authorization request using the bloom filter.

Clause 8: The method of any of clauses 1-7, wherein determining that the potential duplicate authorization request is an actual duplicate authorization request comprises comparing a hash value associated with the authorization request with a hash value associated with a prior authorization request.

Clause 9: The method of any of clauses 1-8, wherein processing the authorization request based on the connectivity quality comprises submitting the authorization request for processing in response to determining that the connectivity quality does not satisfy a threshold.

Clause 10: The method of any of clauses 1-9, further comprising adjusting a sensitivity associated with the bloom filter based on the connectivity quality.

Clause 11: A system for detecting duplicate authorization requests, comprising at least one processor programmed or configured to: receive an authorization request over an electronic payment processing network associated with an electronic payment transaction; determine whether the authorization request is a potential duplicate authorization request or is not a duplicate authorization request based on a bloom filter; in response to determining that the authorization request is a potential duplicate authorization request, determine a connectivity quality associated with the electronic payment processing network; and determine whether to process the authorization request based on the connectivity quality.

Clause 12: The system of clause 11, wherein the connectivity quality is based on at least one of the following: a network health score, a merchant system health score, a payment gateway system health score, an acquirer system health score, a transaction service provider system health score, an issuer system health score, or any combination thereof.

Clause 13: The system of clause 11 or 12, wherein the connectivity quality is based on a response time within the electronic payment processing network.

Clause 14: The system of any of clauses 11-13, wherein the at least one processor is programmed or configured to: in response to determining that the authorization request is a potential duplicate authorization request, determine that the potential duplicate authorization request is an actual duplicate authorization request.

Clause 15: The system of any of clauses 11-14, wherein determining that the potential duplicate authorization request is an actual duplicate authorization request is based on a second filter.

Clause 16: The system of any of clauses 11-15, wherein determining whether to process the authorization request is based on connectivity rules provided by a merchant system.

Clause 17: The system of any of clauses 11-16, wherein the at least one processor is programmed or configured to: determine a hash value associated with the authorization request, wherein determining whether the authorization request is a potential duplicate authorization request comprises comparing the hash value associated with the authorization request with a hash value associated with a prior authorization request using the bloom filter.

Clause 18: The system of any of clauses 11-17, wherein determining that the potential duplicate authorization request is an actual duplicate authorization request comprises comparing a hash value associated with the authorization request with a hash value associated with a prior authorization request.

Clause 19: The system of any of clauses 11-18, wherein processing the authorization request based on the connectivity quality comprises submitting the authorization request for processing in response to determining that the connectivity quality does not satisfy a threshold.

Clause 20: The system of any of clauses 11-19, wherein the at least one processor is programmed or configured to adjust a sensitivity associated with the bloom filter based on the connectivity quality.

Clause 21: A computer program product for detecting duplicate authorization requests, the computer program product comprising at least one non-transitory computer-readable medium including one or more instructions that, when executed by at least one processor, cause the at least one processor to: receive an authorization request over an electronic payment processing network associated with an electronic payment transaction; determine whether the authorization request is a potential duplicate authorization request or is not a duplicate authorization request based on a bloom filter; in response to determining that the authorization request is a potential duplicate authorization request, determine a connectivity quality associated with the electronic payment processing network; and determine whether to process the authorization request based on the connectivity quality.

Clause 22: The computer program product of clause 21, wherein the connectivity quality is based on at least one of the following: a network health score, a merchant system health score, a payment gateway system health score, an acquirer system health score, a transaction service provider system health score, an issuer system health score, or any combination thereof.

Clause 23: The computer program product of clause 21 or 22, wherein the connectivity quality is based on a response time within the electronic payment processing network.

Clause 24: The computer program product of any of clauses 21-23, wherein the one or more instructions cause the at least one processor to: in response to determining that the authorization request is a potential duplicate authorization request, determine that the potential duplicate authorization request is an actual duplicate authorization request.

Clause 25: The computer program product of any of clauses 21-24, wherein determining that the potential duplicate authorization request is an actual duplicate authorization request is based on a second filter.

Clause 26: The computer program product of any of clauses 21-25, wherein determining whether to process the authorization request is based on connectivity rules provided by a merchant system.

Clause 27: The computer program product of any of clauses 21-26, wherein the one or more instructions cause the at least one processor to: determine a hash value associated with the authorization request, wherein determining whether the authorization request is a potential duplicate authorization request comprises comparing the hash value associated with the authorization request with a hash value associated with a prior authorization request using the bloom filter.

Clause 28: The computer program product of any of clauses 21-27, wherein determining that the potential duplicate authorization request is an actual duplicate authorization request comprises comparing a hash value associated with the authorization request with a hash value associated with a prior authorization request.

Clause 29: The computer program product of any of clauses 21-28, wherein processing the authorization request based on the connectivity quality comprises submitting the authorization request for processing in response to determining that the connectivity quality does not satisfy a threshold.

Clause 30: The computer program product of any of clauses 21-29, wherein the one or more instructions cause the at least one processor to adjust a sensitivity associated with the bloom filter based on the connectivity quality.

Clause 31: A method for detecting duplicate authorization requests, comprising: storing, with at least one processor, a hash value associated with a prior authorization request; receiving, with at least one processor, an authorization request over an electronic payment processing network associated with an electronic payment transaction; determining, with at least one processor, a hash value associated with the authorization request; determining, with at least one processor, whether the authorization request is a potential duplicate authorization request by comparing the hash value associated with the authorization request with the hash value associated with the prior authorization request; in response to determining that the authorization request is a potential duplicate authorization request, determining, with at least one processor, a connectivity quality associated with the electronic payment processing network; based on the connectivity quality, determining, with at least one processor, whether to submit the authorization request for processing.

Clause 32: The method of clause 31, wherein the connectivity quality is based on at least one of the following: a network health score, a merchant system health score, a payment gateway system health score, an acquirer system health score, a transaction service provider system health score, an issuer system health score, or some combination thereof.

Clause 33: The method of clause 31 or 32, wherein the connectivity quality is based on a response time within the electronic payment processing network.

Clause 34: The method of any of clauses 31-33, further comprising: in response to determining that the authorization request is a potential duplicate authorization request, determining, with at least one processor, that the potential duplicate authorization request is an actual duplicate authorization request.

Clause 35: The method of any of clauses 31-34, wherein determining whether to submit the authorization request for processing is based on connectivity rules provided by a merchant system.

Clause 36: The method of any of clauses 31-35, wherein determining whether the authorization request is a potential duplicate authorization request comprises using a bloom filter to compare the hash value associated with the authorization request with the hash value associated with the prior authorization request.

Clause 37: The method of any of clauses 31-36, wherein determining that the potential duplicate authorization request is an actual duplicate authorization request comprises comparing the hash value associated with the authorization request with the hash value associated with the prior authorization request.

Clause 38: The method of any of clauses 31-37, further comprising: submitting the authorization request for processing in response to determining that the connectivity quality does not satisfy a threshold.

Clause 39: The method of any of clauses 31-38, further comprising: adjusting a sensitivity associated with the bloom filter based on the connectivity quality.

Clause 40: A system for detecting duplicate authorization requests, comprising at least one processor programmed or configured to: store a hash value associated with a prior authorization request; receive an authorization request over an electronic payment processing network associated with an electronic payment transaction; determine a hash value associated with the authorization request; determine whether the authorization request is a potential duplicate authorization request by comparing the hash value associated with the authorization request with the hash value associated with the prior authorization request; in response to determining that the authorization request is a potential duplicate authorization request, determine a connectivity quality associated with the electronic payment processing network; based on the connectivity quality, determine whether to submit the authorization request for processing.

Clause 41: The system of clause 40, wherein the connectivity quality is based on at least one of the following: a network health score, a merchant system health score, a payment gateway system health score, an acquirer system health score, a transaction service provider system health score, an issuer system health score, or some combination thereof.

Clause 42: The system of clause 40 or 41, wherein the connectivity quality is based on a response time within the electronic payment processing network.

Clause 43: The system of any of clauses 40-42, wherein the at least one processor is programmed or configured to: in response to determining that the authorization request is a potential duplicate authorization request, determine that the potential duplicate authorization request is an actual duplicate authorization request.

Clause 44: The system of any of clauses 40-43, wherein determining whether to submit the authorization request for processing is based on connectivity rules provided by a merchant system.

Clause 45: The system of any of clauses 40-44, wherein determining whether the authorization request is a potential duplicate authorization request comprises using a bloom filter to compare the hash value associated with the authorization request with the hash value associated with the prior authorization request.

Clause 46: The system of any of clauses 40-45, wherein determining that the potential duplicate authorization request is an actual duplicate authorization request comprises comparing the hash value associated with the authorization request with the hash value associated with the prior authorization request.

Clause 47: The system of any of clauses 40-46, wherein the at least one processor is programmed or configured to: submit the authorization request for processing in response to determining that the connectivity quality does not satisfy a threshold.

Clause 48: The system of any of clauses 40-47, wherein the at least one processor is programmed or configured to: adjust a sensitivity associated with the bloom filter based on the connectivity quality.

Clause 49: A computer program product for detecting duplicate authorization requests, the computer program product comprising at least one non-transitory computer-readable medium including one or more instructions that, when executed by at least one processor, cause the at least one processor to: store a hash value associated with a prior authorization request; receive an authorization request over an electronic payment processing network associated with an electronic payment transaction; determine a hash value associated with the authorization request; determine whether the authorization request is a potential duplicate authorization request by comparing the hash value associated with the authorization request with the hash value associated with the prior authorization request; in response to determining that the authorization request is a potential duplicate authorization request, determine a connectivity quality associated with the electronic payment processing network; based on the connectivity quality, determine whether to submit the authorization request for processing.

Clause 50: The computer program product of clause 49, wherein the connectivity quality is based on at least one of the following: a network health score, a merchant system health score, a payment gateway system health score, an acquirer system health score, a transaction service provider system health score, an issuer system health score, or some combination thereof.

Clause 51: The computer program product of clause 49 or 50, wherein the connectivity quality is based on a response time within the electronic payment processing network.

Clause 52: The computer program product of any of clauses 49-51, wherein the one or more instructions cause the at least one processor to: in response to determining that the authorization request is a potential duplicate authorization request, determine that the potential duplicate authorization request is an actual duplicate authorization request.

Clause 53: The computer program product of any of clauses 49-52, wherein determining whether to submit the authorization request for processing is based on connectivity rules provided by a merchant system.

Clause 54: The computer program product of any of clauses 49-53, wherein determining whether the authorization request is a potential duplicate authorization request comprises using a bloom filter to compare the hash value associated with the authorization request with the hash value associated with the prior authorization request.

Clause 55: The computer program product of any of clauses 49-54, wherein determining that the potential duplicate authorization request is an actual duplicate authorization request comprises comparing the hash value associated with the authorization request with the hash value associated with the prior authorization request.

Clause 56: The computer program product of any of clauses 49-55, wherein the one or more instructions cause the at least one processor to: submit the authorization request for processing in response to determining that the connectivity quality does not satisfy a threshold.

Clause 57: The computer program product of any of clauses 49-56, wherein the one or more instructions cause the at least one processor to: adjust a sensitivity associated with the bloom filter based on the connectivity quality.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details of the disclosure are explained in greater detail below with reference to the non-limiting exemplary embodiments that are illustrated in the accompanying schematic figures, in which.

DETAILED DESCRIPTION

Figure 1:
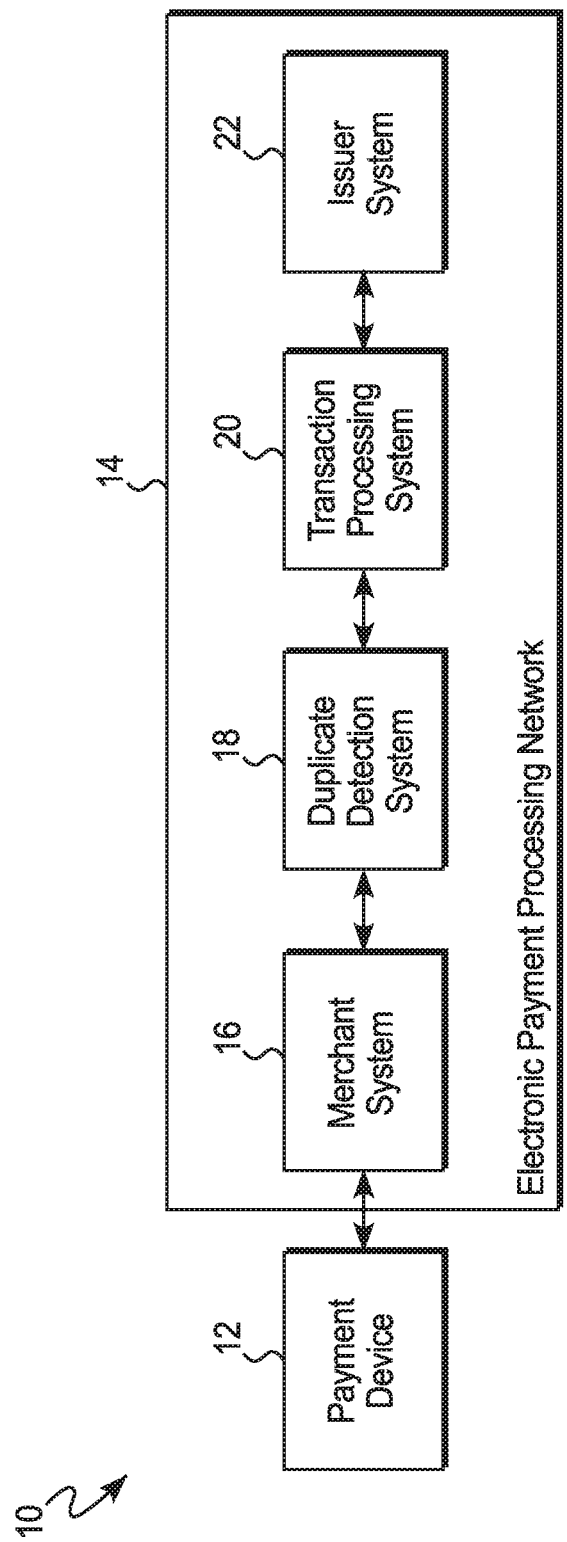
FIG. 1 shows a system for processing a transaction including a duplicate detection system according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "account identifier" may include one or more types of identifiers associated with a user account (e.g., a primary account number (PAN), a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a payment device (e.g., a portable payment instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or another type of identifier. Account identifiers may be alphanumeric, any combination of characters and/or symbols, and/or the like. An issuer institution may be associated with a bank identification number (BIN) that uniquely identifies the issuer institution.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computing devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to users (e.g., users) based on a transaction (e.g., a payment transaction). The term "merchant system" may refer to one or more computer systems, computing devices, and/or software applications operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." As used herein, the term "server" or "processor" may refer to one or more devices that provide a functionality to one or more devices (e.g., one or more client devices) via a network (e.g., a public network, a private network, the Internet, and/or the like). For example, a server may include one or more computing devices. As used herein, the term "system" may refer to one or more devices, such as one or more processors, servers, client devices, computing devices that include software applications, and/or the like. In some non-limiting embodiments or aspects, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Non-limiting embodiment or aspects of the present disclosure are directed to a method, system, and computer program product for detecting duplicate authorization requests (e.g., a duplicate of an authorization request that was previously processed by the electronic payment processing network). Non-limiting embodiments or aspects enable detection of duplicate authorization requests regardless of the merchant associated with the transaction, as such non-limiting embodiments or aspects do not require the merchant systems to implement detection logic on their backend servers or to implement reduced logic. Instead, the detection of duplicate authorization requests may be performed by at least one of a gateway system, an acquirer system, a transaction processing system, and an issuer system. Non-limiting embodiments or aspects utilize connectivity quality associated with the electronic payment processing network over which the transaction is processed to determine whether to process an authorization request identified by the system as a duplicate and/or a potential duplicate. Merchant-defined rules may determine whether a potentially duplicate authorization request should be submitted for processing. Non-limiting embodiments or aspects may utilize a bloom filter to determine whether an authorization request may potentially be a duplicate authorization request. Non-limiting embodiments or aspects may utilize hash values associated with authorization requests to determine whether an authorization request may potentially be a duplicate authorization request. Non-limiting embodiments or aspects enable an electronic payment processing network to more reliably identify potentially duplicate authorization requests before they are submitted for processing and/or to determine which authorization requests should be submitted for processing, which results in a more efficient electronic payment processing network. For example, by reliably identifying potentially duplicate and actually duplicate authorization requests, computational resources are saved which would otherwise be expended processing the duplicate data.

Referring to FIG. 1, a system 10 for processing a transaction including a duplicate detection system is shown according to some non-limiting embodiments or aspects. A payment device 12 associated with a user may be used to initiate a transaction. The transaction may be an electronic payment transaction processed over an electronic payment processing network 14. The electronic payment processing network 14 may include a merchant system 16 operated by or on behalf of the merchant engaging in the transaction with the user. The electronic payment processing network 14 may include a duplicate detection system 18 operated by or on behalf of a duplicate detection entity. The duplicate detection entity may include at least one of an acquirer institution, a payment gateway, a transaction service provider, and an issuer institution. In non-limiting embodiments or aspects, the duplicate detection entity may be a payment gateway. The electronic payment processing network 14 may include a transaction processing system 20 operated by or on behalf of the transaction service provider associated with the payment device 12 of the user. The electronic payment processing network 14 may include an issuer system 22 operated by or on behalf of the issuer issuing the payment device 12 to the user. Other systems not shown in FIG. 1, such as an acquirer system, may also be a component of the electronic payment processing network 14. Processing a payment transaction over the electronic payment processing network 14 may include authorizing, clearing, and/or settling the payment transaction.

With continued reference to FIG. 1, the payment device 12 may be used by the user to initiate a payment transaction. The payment device 12 may be used to initiate the payment transaction by the user physically presenting the payment device to the merchant, by the user communicating account data associated with the payment device to the merchant system 16, by the payment device 12 communicating the account data to the merchant system 16, and/or any other suitable method for initiating a payment transaction with the merchant system 16 using the payment device 12.

In response to the transaction being initiated, the merchant system 16 may generate and communicate an authorization request to the duplicate detection system 18. The authorization request may include account data for processing the payment transaction. The authorization request may contain a unique authorization request identifier. The duplicate detection system 18 may determine whether the authorization request is or may potentially be a duplicate authorization request and/or determine whether to submit the authorization request for further processing (as discussed hereinafter). If the duplicate detection system 18 determines that the authorization request should not be submitted for further processing, the duplicate detection system 18 may terminate processing of the authorization request. The duplicate detection system 18 may determine that the authorization request should not be submitted for further processing if the duplicate detection system 18 determines that the authorization request is determined to be an actual duplicate authorization request or the likelihood that the authorization request is a duplicate satisfies a threshold (e.g., meets or is above a threshold level).

With continued reference to FIG. 1, the duplicate detection system 18 may determine that the authorization request should be submitted for further processing. In such case, the duplicate detection system 18 may communicate the authorization request to the transaction processing system 20. Also in response to such a determination, the duplicate detection system 18 may include data in addition to the account data included in the authorization request communicated by the merchant system 16, such as data indicating that the authorization request was processed by the duplicate detection system 18 and/or that the authorization request is not a duplicate authorization request.

The transaction processing system 20 may communicate the authorization request to the issuer system 22 to cause the issuer system 22 to generate an authorization decision associated with the payment transaction. The authorization decision may be to approve the payment transaction, approve the payment transaction in part, or decline the payment transaction. The issuer system 22 may generate and communicate an authorization response to the transaction processing system 20. The authorization response may include the authorization decision. The transaction processing system 20 may communicate the authorization decision to the merchant system 16, directly or indirectly through the duplicate detection system 18.

Figure 2:
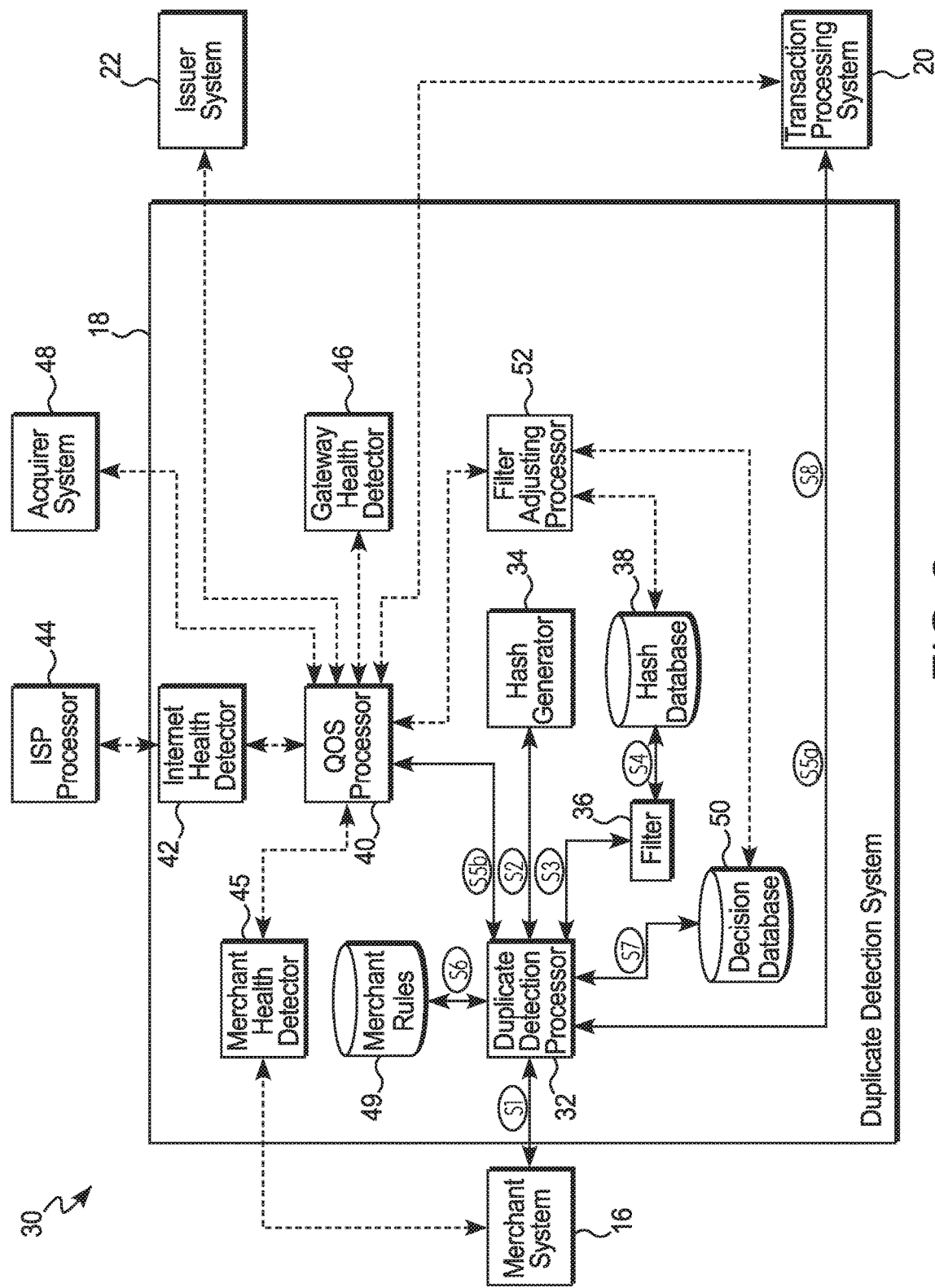
FIG. 2 shows a system for detecting duplicate authorization requests according to some non-limiting embodiments or aspects.

Referring to FIG. 2, a system 30 for detecting duplicate authorization requests is shown according to some non-limiting embodiments or aspects. The system 30 may determine whether the authorization request is or may potentially be a duplicate authorization request and/or determine whether to submit the authorization request for further processing (as previously discussed). The system 30 may include the duplicate detection system 18. It will be appreciate that any of the components (e.g., processors, databases, and the like) of the duplicate detection system 18 (described hereinafter) may be combined with or separate from any of the other components of the duplicate detection system 18.

Figure 3:
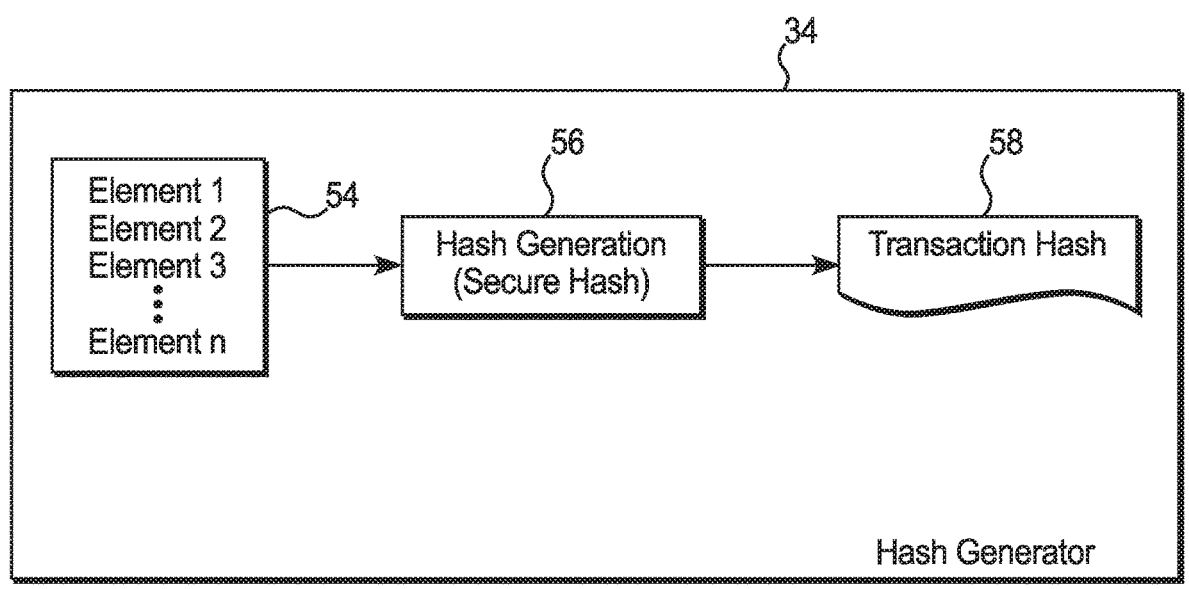
FIG. 3 shows a hash generator according to some non-limiting embodiments or aspects.

Referring to FIGS. 2 and 3, at a step S1, the merchant system 16 may communicate the authorization request to a duplicate detection processor 32 of the duplicate detection system 18. The authorization request may comprise a transaction packet 54 including a plurality of data elements. The data elements may include account data for processing the payment transaction, the authorization request identifier, and/or the like.

At a step S2, the duplicate detection processor 32 may communicate with a hash generator 34 to generate a hash associated with the authorization request. The hash generator 34 may include a hash generation processor 56 to hash at least a portion of the transaction packet 54, such as at least a portion of the plurality of data elements contained therein. The hash generation processor 56 may generate a transaction hash 58 associated with the authorization request. The hash generation processor 56 may generate the transaction hash 58 using any suitable hash function algorithm (e.g., SHA-3, SHA-256, etc.). The hash generator 34 may communicate the transaction hash 58 to the duplicate detection processor 32.

With continued reference to FIG. 2, at a step S3, the duplicate detection processor 32 may communicate with at least one filter 36 to determine whether the authorization request is a potential duplicate authorization request. The filter 36 may determine whether the authorization request is a potential duplicate authorization request based on the transaction hash 58 and/or other data associated with the authorization request. At a step S4, the filter 36 may communicate with a hash database 38. The hash database 38 may include hash values associated with authorization requests previously processed by the electronic payment processing network 14. The transaction hash 58 may be stored in the hash database 38 for detecting subsequent potential duplicate authorization requests. The hash database 38 may include a volatile or non-volatile memory for storing the hash values and any additional relevant data associated with authorization requests. The filter adjusting processor 52 may adjust the size of the hash database 38 and/or the time for which a hash value is stored in the hash database 38 based on the determined connectivity quality.

The filter 36 may determine whether the authorization request is a potential authorization request. The filter 36 may determine whether the authorization request is a potential authorization request based on comparing the transaction hash 58 with hashes stored in the hash database 38. The filter 36 may determine whether the authorization request is a potential duplicate authorization request based on other data associated with the authorization request, such as the account data contained in the authorization request and/or the unique authorization request identifier associated with the authorization request.

The filter 36 may include a bloom filter configured to determine whether (based on the transaction hash 58 and/or other data associated with the authorization request) the authorization request may be a potential duplicate authorization request or is not a duplicate authorization request. The bloom filter may be configured to return one of two values: (1) that the transaction hash 58 possibly matches a hash value from the hash database 38; or (2) that the transaction hash 58 definitely does not match a hash value from the hash database 38. The bloom filter may be configured to return one of two values: (1) that the other data from the authorization request (e.g., unique authorization request identifier or other data associated with the authorization request) possibly matches other data from prior authorization requests, which may be stored in the hash database 38 or other database of the duplicate detection system 18; or (2) that the other data from the authorization request definitely does not match other data from prior authorization requests. As such a "false positive" match may be possible while a "false negative" match may not be possible based on the bloom filter.

A different type of filter (e.g., a filter other than a bloom filter) may be used in addition to or in lieu of the bloom filter.

The size (and thus the sensitivity) of the bloom filter may be specified and/or adjusted by a filter adjusting processor 52 to set the probability of a "false positive" being returned by the bloom filter and/or to set the speed at which the bloom filter operates. The size of the bloom filter may be adjusted by the filter adjusting processor 52 based on a connectivity quality determined by the QOS processor 40 (as described hereinafter), with which the filter adjusting processor 52 is in communication.

At a step S5a, in response to determining that the transaction hash 58 (and/or other data) definitely (e.g., actually or with greater certainty) does not match a hash value from the hash database 38 (and/or other data), the duplicate detection system 18 may communicate the authorization request to the transaction processing system 20 for further processing of the transaction (because the duplicate detection system 18 determined that the authorization request is not a duplicate based on the bloom filter).

In response to determining that the transaction hash 58 (and/or other data) possibly matches a hash value from the hash database 38 (and/or other data), the duplicate detection system 18 may perform additional processing of the authorization request to determine whether the authorization request should be communicated to the transaction processing system 20 for further processing of the transaction.

In some non-limiting embodiments or aspects, the additional processing may include determining whether the authorization request definitely is or definitely is not a duplicate authorization request (e.g., is actually a duplicate authorization request) (based on the transaction hash 58 (and/or other data)). The filter 36 may include a second filter in addition to and subsequent to the bloom filter for determining whether the authorization request definitely is or definitely is not a duplicate authorization request. If the second filter determines that the transaction hash 58 (and/or other data) definitely does not match a hash value from the hash database 38 (and/or other data), the duplicate detection system 18 may communicate the authorization request to the transaction processing system 20 for further processing of the transaction (because the duplicate detection system 18 determined that the authorization request is not a duplicate based on the second filter). If the second filter determines that the transaction hash 58 (and/or other data) definitely does match a hash value from the hash database 38 (and/or other data), the duplicate detection system 18 may terminate processing of the authorization request (because the duplicate detection system 18 determined that the authorization request is a duplicate based on the second filter).

In some non-limiting embodiments or aspects, a second filter to definitively determine whether the authorization request is a duplicate is not included, and the additional processing may include, at a step S5b, the duplicate detection processor 32 communicating a connectivity inquiry to a quality of service (QOS) processor 40. The QOS processor 40 may be any computing device that determines a connectivity quality associated with the electronic payment processing network 14 and returns a connectivity response to the duplicate detection processor 32, including the determined connectivity quality. The determined connectivity quality may be based on a response time within the electronic payment processing network 14, such as a response time of at least one of the systems operating as a component of the electronic payment processing network 14.

The connectivity quality may be based on at least one of the following: a network health score, a merchant system health score, a payment gateway system health score, an acquirer system health score, a transaction service provider system health score, an issuer system health score, or any combination thereof. The QOS processor 40 may obtain any of these health scores to determine the connectivity quality.

With continued reference to FIG. 2, in some non-limiting embodiments or aspects, the QOS processor 40 may communicate with a network health detector 42 to determine a network health score (e.g., an internet health score). The network health detector 42 may communicate with at least one ISP processor 44 operated by or on behalf of at least one entity providing data associated with network connectivity provided by at least one internet service provider (ISP) or some other network provider. As a non-limiting example, the ISP processor 44 may include an API configured to provide data regarding internet connectivity, such as DynaTrace®, Akamai®, and/or Pingdom®. The network connectivity data from the ISP processor 44 may include latency data, data packet loss data, ping time data, and the like. The network connectivity data may be associated with the network connectivity at the time the authorization request is being processed or for some time period or range of time periods prior to the processing of the authorization request, such as network connectivity data from the last second, minute, hour, day, week, and the like. In response to receiving the network connectivity data from the ISP processor 44, the network health detector 42 may determine the network health score (or may receive the network health score from the ISP processor 44). The network health detector 42 may communicate the network health score to the QOS processor 40. The network health score may be represented by a score, such as a numerical score, a letter grade, a pass/fail grade, or another type of grade.

With continued reference to FIG. 2, in some non-limiting embodiments or aspects, the QOS processor 40 may communicate with a merchant health detector 45 to determine a merchant system health score. The merchant health detector 45 may communicate with the merchant system 16 to determine the merchant system health score. The merchant system health score may be based on merchant response data, such as data provided by the merchant system 16 associated with response times of the merchant system, drop rate of data packets received by the merchant system 16, duplicate submission statistics associated with the merchant system 16, or other data that may indicate how reliably the merchant system 16 is communicating over the electronic payment processing network 14. The merchant response data may be associated with the merchant health at the time the authorization request is being processed or for some time period or range of time periods prior to the processing of the authorization request, such as merchant response data from the last second, minute, hour, day, week, and the like. In response to receiving the merchant response data from the merchant system 16, the merchant health detector 45 may determine the merchant system health score (or may receive the merchant system health score from the merchant system 16). The merchant system health detector 45 may communicate the merchant system health score to the QOS processor 40. The merchant system health score may be represented by a score, such as a numerical score, a letter grade, a pass/fail grade, or another type of grade.

With continued reference to FIG. 2, in some non-limiting embodiments or aspects, the QOS processor 40 may communicate with a gateway health detector 46 to determine a payment gateway system health score. The payment gateway system health score may be based on gateway response data, such as data associated with response times of the gateway system, drop rate of data packets received by the gateway system, duplicate submission statistics associated with the gateway system, or other data that may indicate how reliably the gateway system is communicating over the electronic payment processing network 14. The gateway response data may be associated with the gateway health at the time the authorization request is being processed or for some time period or range of time periods prior to the processing of the authorization request, such as gateway response data from the last second, minute, hour, day, week, and the like. Based on the gateway response data, the gateway health detector 46 may determine the payment gateway system health score. The gateway system health detector 46 may communicate the payment gateway system health score to the QOS processor 40. The gateway system health score may be represented by a score, such as a numerical score, a letter grade, a pass/fail grade, or another type of grade.

With continued reference to FIG. 2, in some non-limiting embodiments or aspects, the QOS processor 40 may communicate with an acquirer system 48 (and/or an acquirer system health detector (not shown)) to determine an acquirer system health score. The acquirer system health score may be based on acquirer response data, such as data associated with response times of the acquirer system 48, drop rate of data packets received by the acquirer system 48, duplicate submission statistics associated with the acquirer system 48, or other data that may indicate how reliably the acquirer system 48 is communicating over the electronic payment processing network 14. The acquirer response data may be associated with the acquirer health at the time the authorization request is being processed or for some time period or range of time periods prior to the processing of the authorization request, such as acquirer response data from the last second, minute, hour, day, week, and the like. Based on the acquirer response data, the acquirer system 48 (and/or the acquirer system health detector) may determine the acquirer system health score. The acquirer system 48 (and/or the acquirer system health detector) may communicate the acquirer system health score to the QOS processor 40. The acquirer system health score may be represented by a score, such as a numerical score, a letter grade, a pass/fail grade, or another type of grade.

With continued reference to FIG. 2, in some non-limiting embodiments or aspects, the QOS processor 40 may communicate with the transaction processing system 20 (and/or a transaction processing system health detector (not shown)) to determine a transaction service provider system health score. The transaction service provider system health score may be based on transaction service provider response data, such as data associated with response times of the transaction processing system 20, drop rate of data packets received by the transaction processing system 20, duplicate submission statistics associated with the transaction processing system 20, or other data that may indicate how reliably the transaction processing system 20 is communicating over the electronic payment processing network 14. The transaction service provider response data may be associated with the transaction service provider health at the time the authorization request is being processed or for some time period or range of time periods prior to the processing of the authorization request, such as transaction service provider response data from the last second, minute, hour, day, week, and the like. Based on the transaction service provider response data, the transaction processing system 20 (and/or the transaction processing system health detector) may determine the transaction service provider system health score. The transaction processing system 20 (and/or the transaction processing system health detector) may communicate the transaction service provider system health score to the QOS processor 40. The transaction service provider system health score may be represented by a score, such as a numerical score, a letter grade, a pass/fail grade, or another type of grade.

With continued reference to FIG. 2, in some non-limiting embodiments or aspects, the QOS processor 40 may communicate with the issuer system 22 (and/or an issuer system health detector (not shown)) to determine an issuer system health score. The issuer system health score may be based on issuer response data, such as data associated with response times of the issuer system 22, drop rate of data packets received by the issuer system 22, duplicate submission statistics associated with the issuer system 22, or other data that may indicate how reliably the issuer system 22 is communicating over the electronic payment processing network 14. The issuer response data may be associated with the issuer health at the time the authorization request is being processed or for some time period or range of time periods prior to the processing of the authorization request, such as issuer system response data from the last second, minute, hour, day, week, and the like. Based on the issuer response data, the issuer system 22 (and/or the issuer system health detector) may determine the issuer system health score. The issuer system 22 (and/or the issuer system health detector) may communicate the issuer system health score to the QOS processor 40. The issuer system health score may be represented by a score, such as a numerical score, a letter grade, a pass/fail grade, or another type of grade.

In some non-limiting embodiments or aspects, the QOS processor 40 may communicate with one or more other components communicating within the electronic payment processing network 14 to determine a health score associated each of the one or more other components. The health score associated with each of the one or more other components may be used as a factor in determining the connectivity quality. The health score of the one or more other components may be represented by a score, such as a numerical score, a letter grade, a pass/fail grade, or another type of grade.

With continued reference to FIG. 2, in some non-limiting embodiments or aspects, the QOS processor 40 may determine the connectivity quality based on at least one of the following health components: the network health score, the merchant system health score, the payment gateway system health score, the acquirer system health score, the transaction service provider system health score, the issuer system health score, or any combination thereof. The connectivity quality may be determined using an algorithm which weights the health component(s) used to determine the connectivity quality. Any suitable algorithm or weights may be used to determine the connectivity quality. The connectivity quality may be represented by a score, such as a numerical score, a letter grade, a pass/fail grade, or another type of grade.

With continued reference to FIG. 2, at a step S6, the duplicate detection processor 32 may communicate with a merchant rules database 49 to determine whether the authorization request should be processed. The merchant rules database 49 may contain connectivity rules determined by or for of the merchant system 16. The connectivity rules may include rules governing whether the authorization request determined to be a potential duplicate by the filter 36 is to be submitted for further processing. As a non-limiting example, the connectivity rules may specify that the authorization request is to be submitted for further processing in response to the QOS processor 40 determining that the connectivity quality satisfies a threshold (e.g., is above, meets, or below a threshold level). For example, the connectivity rules may specify that poor connectivity quality (below a predetermined threshold so as to not satisfy the threshold) indicates a sufficiently high likelihood that the authorization request was not previously processed (e.g., due to the poor connectivity quality) and should be submitted for further processing. Other merchant rules may be based on a cost associated with submitting the potentially duplicate authorization request, a frequency with which potentially duplicate authorization requests should be submitted, or any other factor deemed relevant by the merchant system 16 or other system determining the connectivity rules. The connectivity rules may be specific to the merchant involved in the transaction or may apply to all merchants or some subset of all merchants conducting transactions. Other Merchant rules may be independent of connectivity and used to determine whether an authorization request is to be submitted for processing. Non-limiting examples may include submitting an authorization request for processing based on a transaction amount associated with the authorization request, the goods and/or services associated with the transaction associated with the authorization request, the user associated with the authorization request and the like.

The connectivity rules may be definitive or conjunctive with the filter 36. A definitive connectivity rule may determine whether an authorization request is to be submitted for further processing regardless of the determination by the filter 36 as to whether the authorization request is a potentially duplicate authorization request. A connectivity rule may be a parameter used in conjunction with the determination of the filter 36 to determine whether the authorization request is to be processed.

At a step S7, the duplicate detection processor may communicate with a decision database 50 which stores historical data, such as historical decisions and historical decision rates associated with authorization requests submitted for processing by the duplicate detection system 18. The historical decision rate may be a rate at which potentially duplicate authorization requests have been submitted for processing during some previous time period. The filter adjusting processor 52 may communicate with the decision database 50 to adjust the rate at which potentially duplicate authorization requests should be submitted for processing. This rate may be adjusted based on the filter adjusting processor 52 communicating with the QOS processor 40 to obtain the real time state of the connectivity quality. The filter adjusting processor 52 may continuously or periodically communicate with the QOS processor 40 to obtain the connectivity quality. The historical decision rate (or adjusted historical decision rate) and/or other historical data may be a factor in determining whether the potentially duplicate authorization request should be submitted for processing. Merchant rules may specify a rule for submitting authorization requests for processing based on the historical data.

With continued reference to FIG. 2, at a step S8, the duplicate detection processor 32 may determine whether to process the authorization request. This determination may be made based on at least one of the previously described connectivity quality, merchant rules, historical data, and/or the like. If the duplicate detection processor 32 determines that the authorization request is to not be further processed, the duplicate detection system 18 may, in response, terminate processing of the authorization request. If the duplicate detection processor 32 determines that the authorization request is to be further processed, the duplicate detection processor 32 may, in response, communicate the authorization request to the transaction processing system 20 for further processing.

Figure 4:
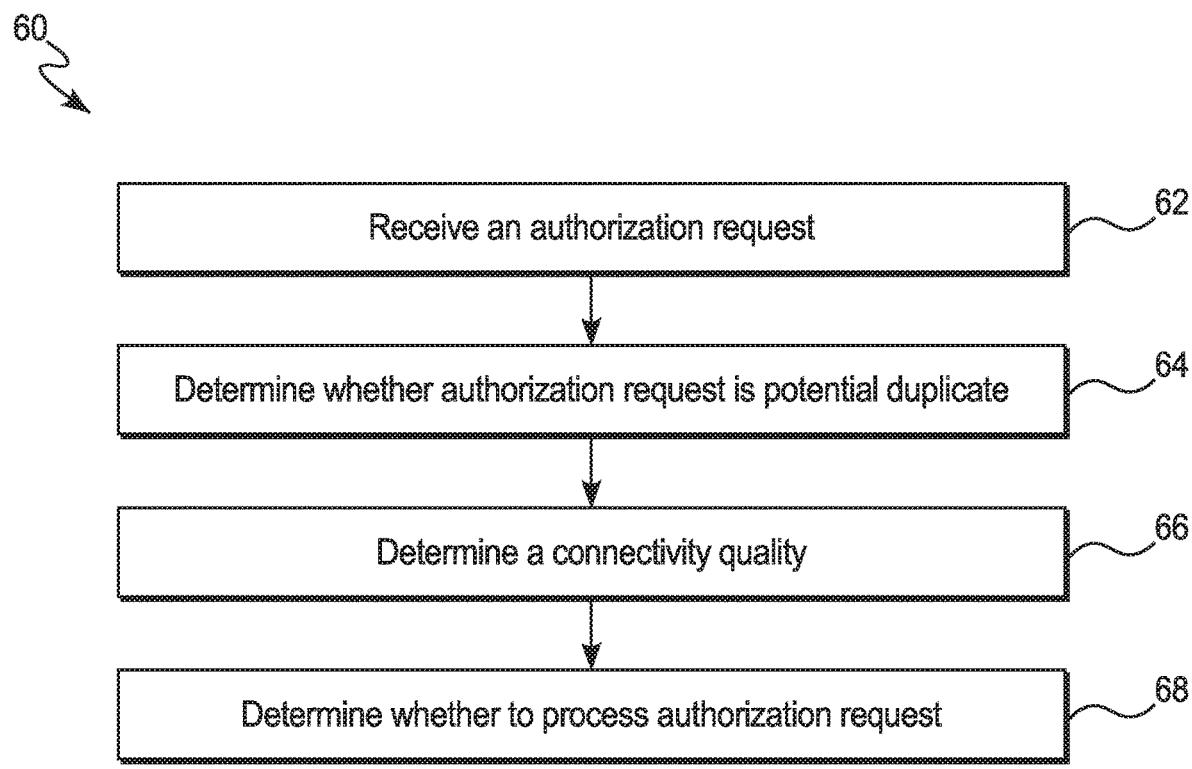
FIG. 4 shows a sequence diagram of a method for detecting duplicate authorization requests according to some non-limiting embodiments or aspects.

Referring to FIG. 4, a method 60 for detecting duplicate authorization requests is shown according to some non-limiting embodiments or aspects. At a step 62, the duplicate detection system may receive an authorization request over the electronic payment processing network. The authorization request may be associated with an electronic payment transaction. At a step 64, the duplicate detection system may determine whether the authorization request is a potential duplicate authorization request or is not a duplicate authorization request based on the bloom filter. At a step 66, the duplicate detection system may, in response to determining that the authorization request is a potential duplicate authorization request, determine a connectivity quality associated with the electronic payment processing network. At a step 68, the duplicate detection system may determine whether to process the authorization request based on the connectivity quality.

Figure 5:
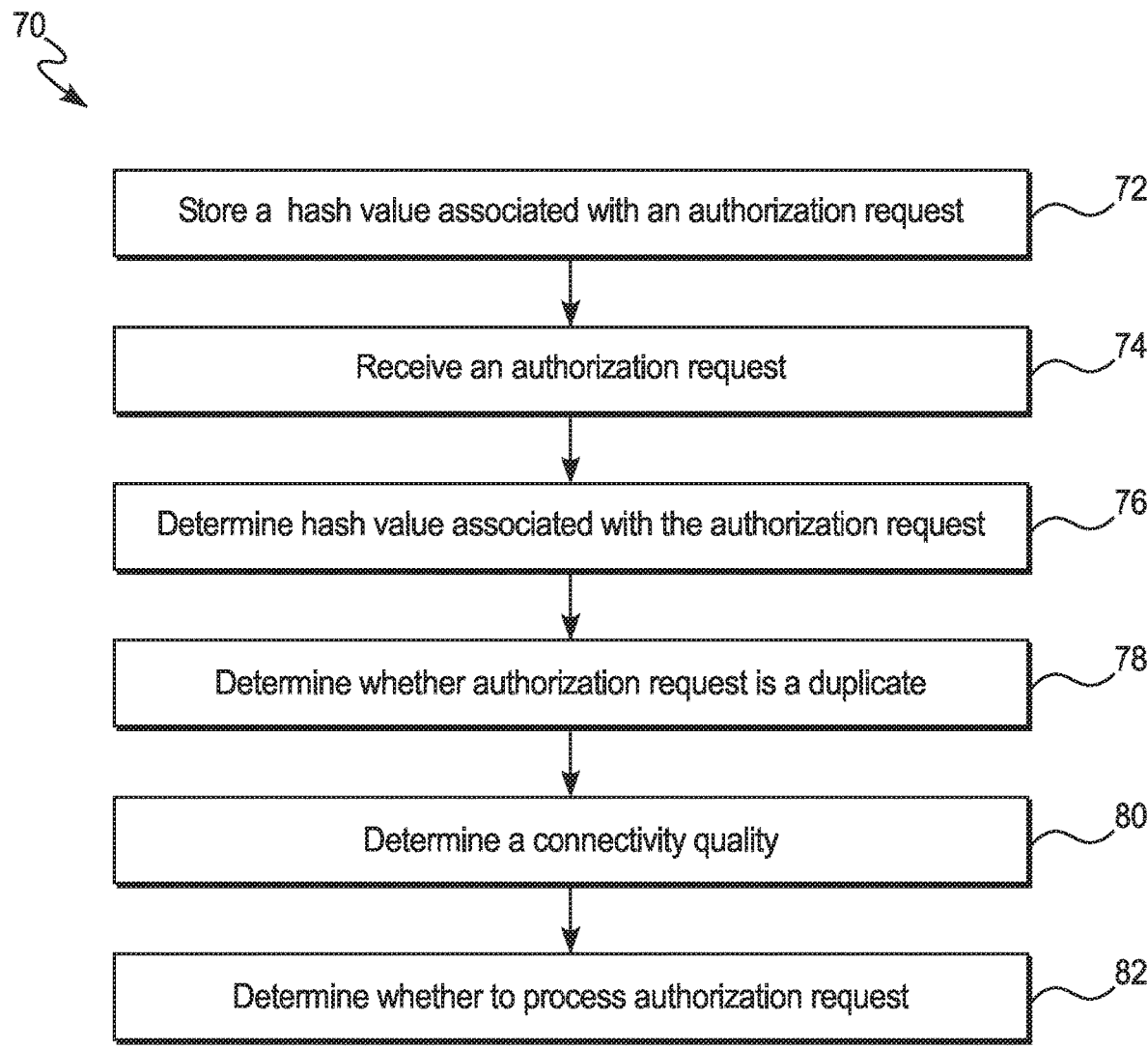
FIG. 5 shows a sequence diagram of a method for detecting duplicate authorization requests according to some non-limiting embodiments or aspects.

Referring to FIG. 5, a method 70 for detecting duplicate authorization requests is shown according to some non-limiting embodiments or aspects. At a step 72, the duplicate detection system may store a hash value associated with a prior authorization request. At a step 74, the duplicate detection system may receive an authorization request over an electronic payment processing network associated with an electronic payment transaction. At a step 76, the duplicate detection system may determine a hash value associated with the authorization request. At a step 78, the duplicate detection system may determine whether the authorization request is a potential duplicate authorization request by comparing the hash value associated with the authorization request with the hash value associated with the prior authorization request. At a step 80, the duplicate detection system may, in response to determining that the authorization request is a potential duplicate authorization request, determine a connectivity quality associated with the electronic payment processing network. At a step 82, the duplicate detection system may, based on the connectivity quality, determine whether to submit the authorization request for processing.

In a further, non-limiting embodiment or aspect, a computer program product for detecting duplicate authorization requests includes at least one non-transitory computer readable medium including program instructions that, when executed by at least one processor, cause the at least one processor to execute one of the previously-described methods. The at least one processor may include at least one of the merchant system, the duplicate detection system, the transaction processing system, the issuer system, the acquirer system, and the payment gateway system.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for detecting duplicate authorization requests, comprising:
   receiving, with at least one processor, an authorization request over an electronic payment processing network associated with an electronic payment transaction;
   determining, with at least one processor, whether the authorization request is a potential duplicate authorization request or is not a duplicate authorization request based on a bloom filter;
   in response to determining that the authorization request is a potential duplicate authorization request, determining, with at least one processor, a connectivity quality associated with the electronic payment processing network;

determining, with at least one processor, that the connectivity quality fails to satisfy a quality threshold; and in response to determining that the connectivity quality fails to satisfy the quality threshold, determining, with at least one processor, the authorization request for processing.

2. The method of claim 1, wherein the connectivity quality is based on at least one of the following: a network health score, a merchant system health score, a payment gateway system health score, an acquirer system health score, a transaction service provider system health score, an issuer system health score, or any combination thereof.

3. The method of claim 1, wherein the connectivity quality is based on a response time within the electronic payment processing network.

4. The method of claim 1, further comprising:
in response to determining that the authorization request is a potential duplicate authorization request, determining, with at least one processor, that the potential duplicate authorization request is an actual duplicate authorization request.

5. The method of claim 4, wherein determining that the potential duplicate authorization request is an actual duplicate authorization request is based on a second filter.

6. The method of claim 4, wherein determining that the potential authorization request is an actual duplicate authorization request comprises comparing a hash value associated with the authorization request with a hash value associated with a prior authorization request.

7. The method of claim 1, further comprising:
determining, with at least one processor, a hash value associated with the authorization request,
wherein determining whether the authorization request is a potential duplicate authorization request comprises comparing the hash value associated with the authorization request with a hash value associated with a prior authorization request using the bloom filter.

8. The method of claim 1, wherein determining that the connectivity quality fails to satisfy the quality threshold is based on connectivity rules provided by a merchant system.

9. The method of claim 1, further comprising adjusting a sensitivity associated with the bloom filter based on the connectivity quality.

10. A system for detecting duplicate authorization requests, comprising at least one processor programmed or configured to:
receive an authorization request over an electronic payment processing network associated with an electronic payment transaction;
determine whether the authorization request is a potential duplicate authorization request or is not a duplicate authorization request based on a bloom filter;
in response to determining that the authorization request is a potential duplicate authorization request, determine a connectivity quality associated with the electronic payment processing network;
determine that the connectivity quality fails to satisfy a quality threshold; and
in response to determining that the connectivity quality fails to satisfy the quality threshold, submit the authorization request for processing.

11. The system of claim 10, wherein the connectivity quality is based on at least one of the following: a network health score, a merchant system health score, a payment gateway system health score, an acquirer system health score, a transaction service provider system health score, an issuer system health score, or any combination thereof.

12. The system of claim 10, wherein the connectivity quality is based on a response time within the electronic payment processing network.

13. The system of claim 10, wherein the at least one processor is programmed or configured to:
in response to determining that the authorization request is a potential duplicate authorization request, determine that the potential duplicate authorization request is an actual duplicate authorization request.

14. The system of claim 13, wherein determining that the potential duplicate authorization request is an actual duplicate authorization request is based on a second filter.

15. The system of claim 13, wherein determining that the potential duplicate authorization request is an actual duplicate authorization request comprises comparing a hash value associated with the authorization request with a hash value associated with a prior authorization request.

16. The system of claim 10, wherein the at least one processor is programmed or configured to:
determine a hash value associated with the authorization request,
wherein determining whether the authorization request is a potential duplicate authorization request comprises comparing the hash value associated with the authorization request with a hash value associated with a prior authorization request using the bloom filter.

17. The system of claim 10, wherein determining whether to process the authorization request is based on connectivity rules provided by a merchant system.

18. The system of claim 10, wherein the at least one processor is programmed or configured to adjust a sensitivity associated with the bloom filter based on the connectivity quality.

* * * * *